(12) United States Patent
Chen

(10) Patent No.: US 9,777,857 B2
(45) Date of Patent: Oct. 3, 2017

(54) FLOW CONTROL VALVE

(71) Applicants: Pao-Tang Chen, Lukang Township, Changhua County (TW); Hung-Shan Chen, Lukang Township, Changhua County (TW)

(72) Inventor: Chi-Fu Chen, Lukang Township (TW)

(73) Assignees: Pao-Tang Chen, Lukang Township (TW); Hung-Shan Chen, Lukang Township (TW)

( * ) Notice: Subject to any disclaimer, the term of this patent is extended or adjusted under 35 U.S.C. 154(b) by 124 days.

(21) Appl. No.: 14/990,828

(22) Filed: Jan. 8, 2016

(65) Prior Publication Data
US 2017/0198826 A1    Jul. 13, 2017

(51) Int. Cl.
| F16K 17/34 | (2006.01) |
| F16K 15/14 | (2006.01) |
| G05D 7/01 | (2006.01) |
| F16K 17/168 | (2006.01) |

(52) U.S. Cl.
CPC ............ *F16K 17/34* (2013.01); *F16K 15/148* (2013.01); *F16K 17/168* (2013.01); *G05D 7/012* (2013.01); *G05D 7/0113* (2013.01); *Y10T 137/784* (2015.04); *Y10T 137/7869* (2015.04)

(58) Field of Classification Search
CPC .......... Y10T 137/7839; Y10T 137/784; Y10T 137/7869; Y10T 137/87716; Y10T 137/7891; Y10T 137/789; F16K 17/30; F16K 17/34; F16K 17/168; G05D 7/012; G05D 7/0113

USPC ................ 137/512.1, 512.15, 517, 801, 863; 138/43; 251/123

See application file for complete search history.

(56) References Cited

U.S. PATENT DOCUMENTS

| 1,634,949 A | * | 7/1927 | Le Valley | ............... F16K 15/16 137/512.15 |
| 2,777,464 A | * | 1/1957 | Mosely | .................... D06F 9/088 137/516.13 |
| 2,851,060 A | * | 9/1958 | Fleischer | ................. F16K 17/34 138/46 |
| 2,948,296 A | * | 8/1960 | Thorburn | ................. F16K 17/34 137/517 |
| 3,216,451 A | * | 11/1965 | Smallpeice | ............ G05D 7/012 137/516.25 |
| 4,344,459 A | * | 8/1982 | Nelson | .................... G05D 7/012 138/41 |

(Continued)

*Primary Examiner* — Matthew W Jellett
(74) *Attorney, Agent, or Firm* — Alan D. Kamrath; Kamrath IP Lawfirm, P.A.

(57) ABSTRACT

A flow control valve includes a valve body, a control member and a cover. The valve body has a receiving space, a resting face, a stepped face, a positioning groove and a plurality of water outlet holes. The control member is provided with an elastic portion, a sealing portion and an abutting face. When a flow pressure of the fluid is under a normal condition, the elastic portion of the control member is contracted inward, so that the abutting face of the control member is disposed at an open state. When the flow pressure of the fluid is under an abnormal condition, the elastic portion is expanded outward and abuts the stepped face of the valve body, so that the abutting face of the control member abuts the resting face of the valve body, to seal the water outlet holes of the valve body.

8 Claims, 7 Drawing Sheets

(56) References Cited

U.S. PATENT DOCUMENTS

| | | | | |
|---|---|---|---|---|
| 5,226,446 A | * | 7/1993 | Cooper | G05D 7/012 137/517 |
| 5,469,883 A | * | 11/1995 | Lee | G05D 7/012 137/498 |
| 5,899,224 A | * | 5/1999 | Moldenhauer | B67D 7/36 137/513.3 |
| 8,763,644 B2 | * | 7/2014 | Tsai | F15D 1/025 138/39 |

\* cited by examiner

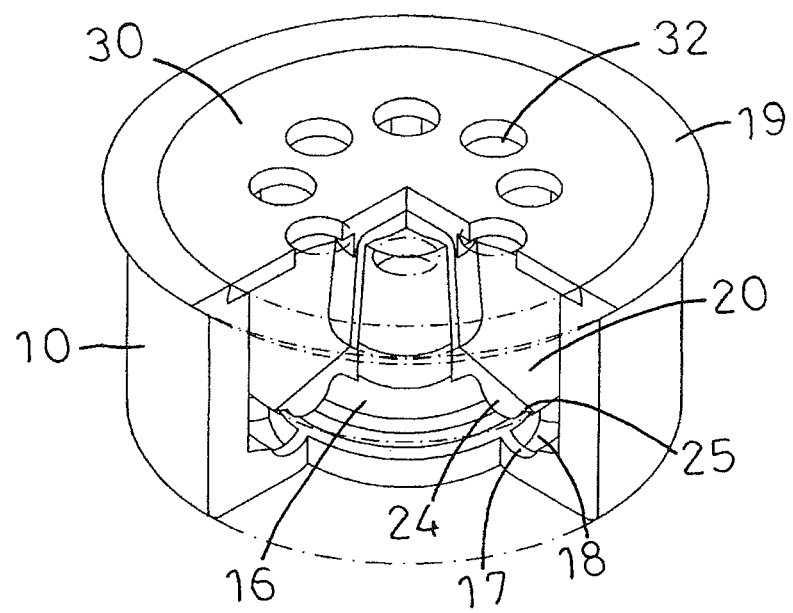
FIG·1
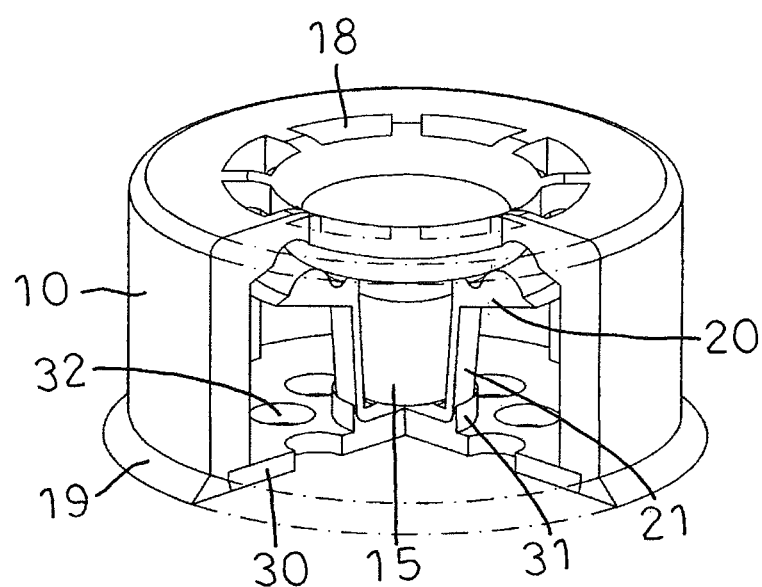
FIG·2

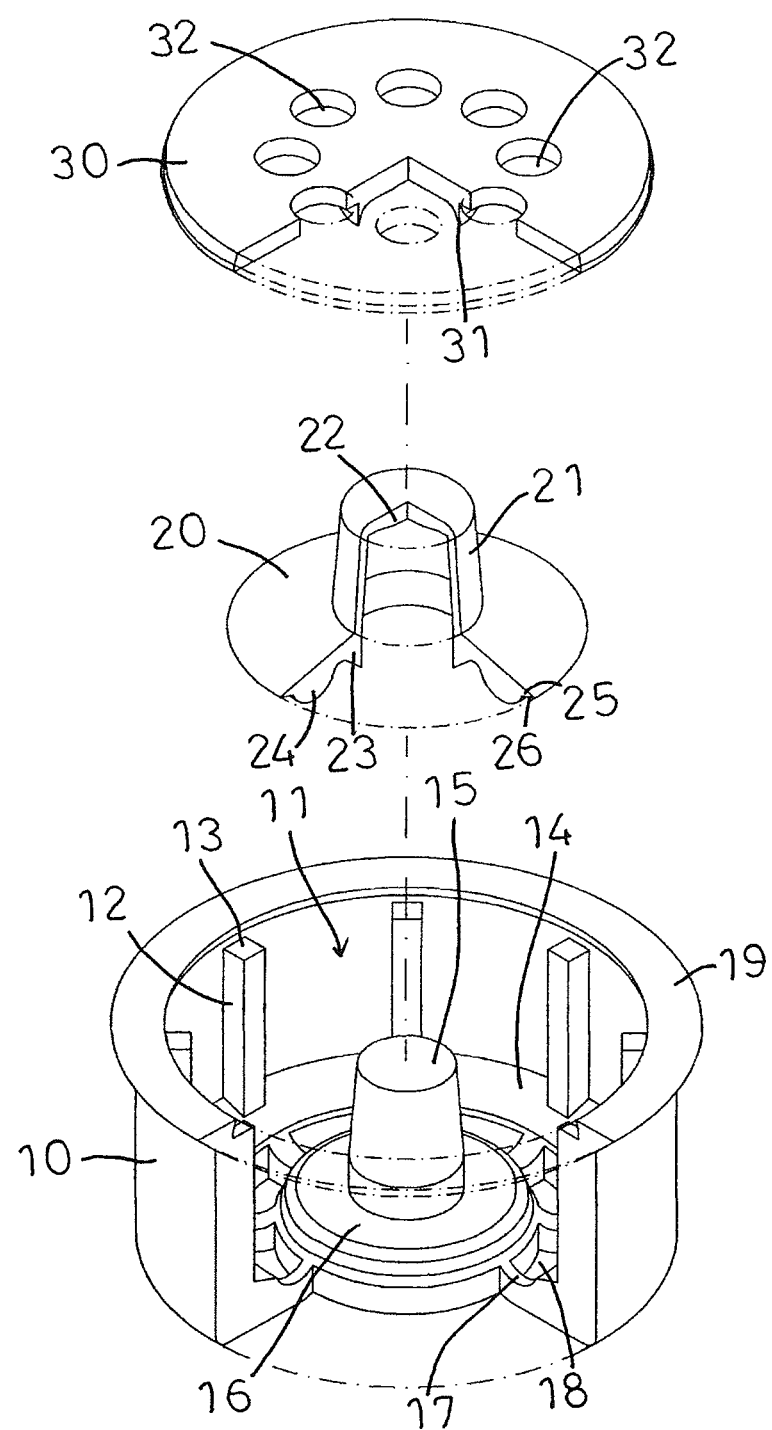
FIG·3

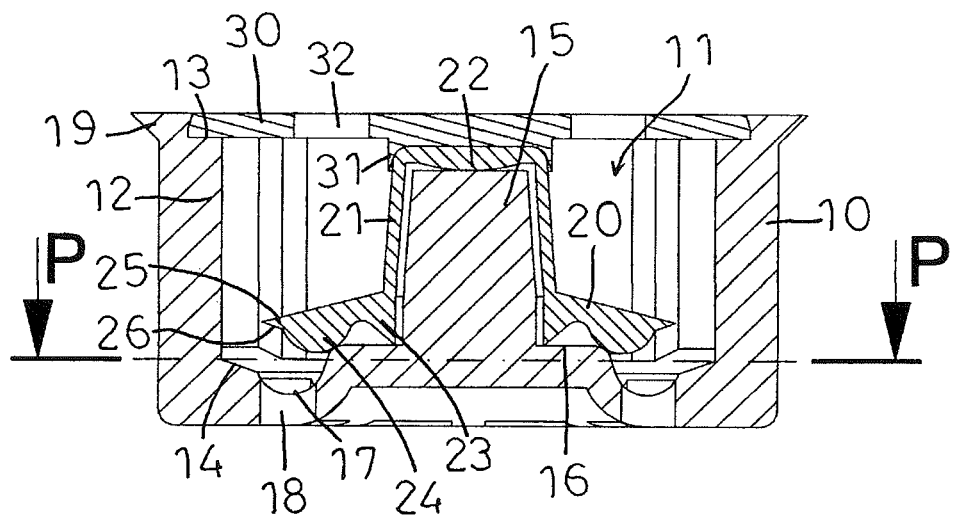
FIG·4
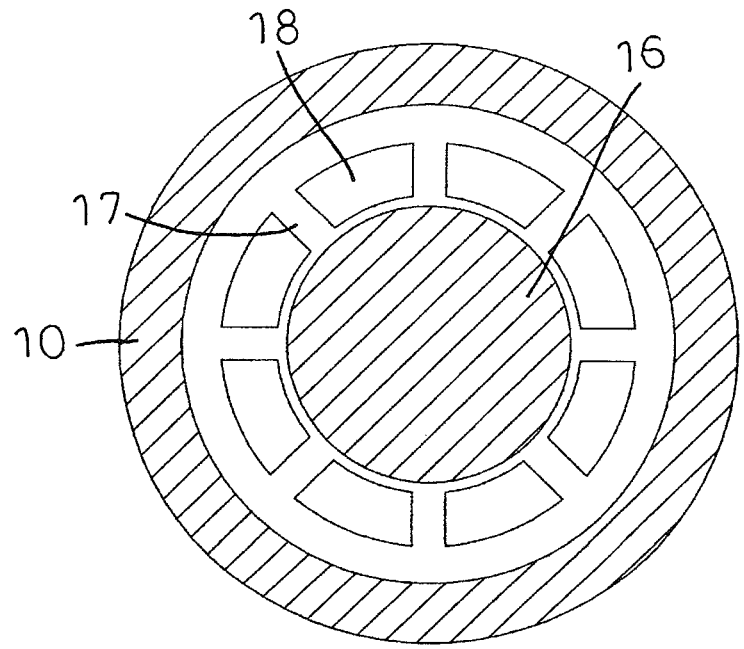
P-P
FIG·5

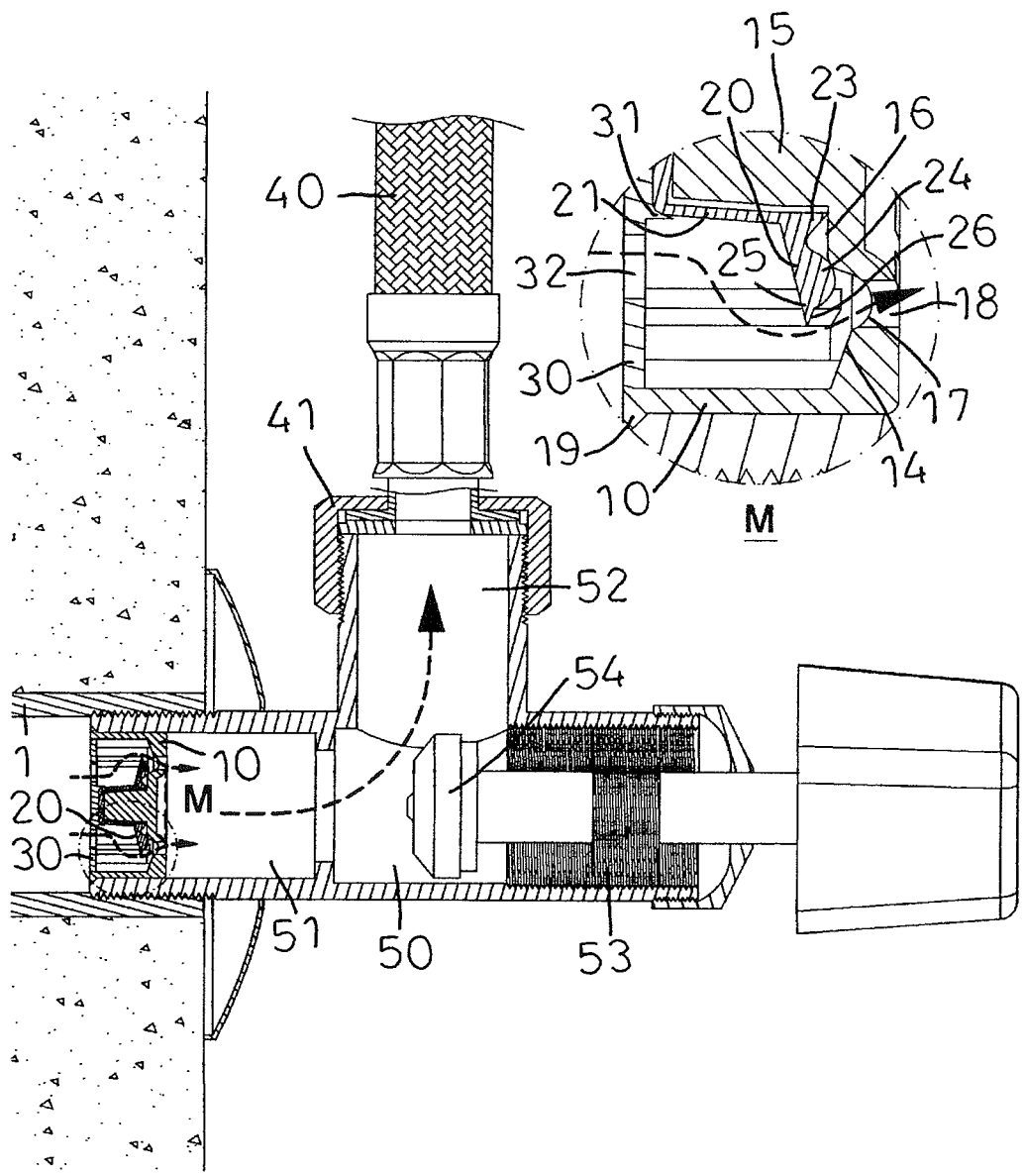
FIG·6

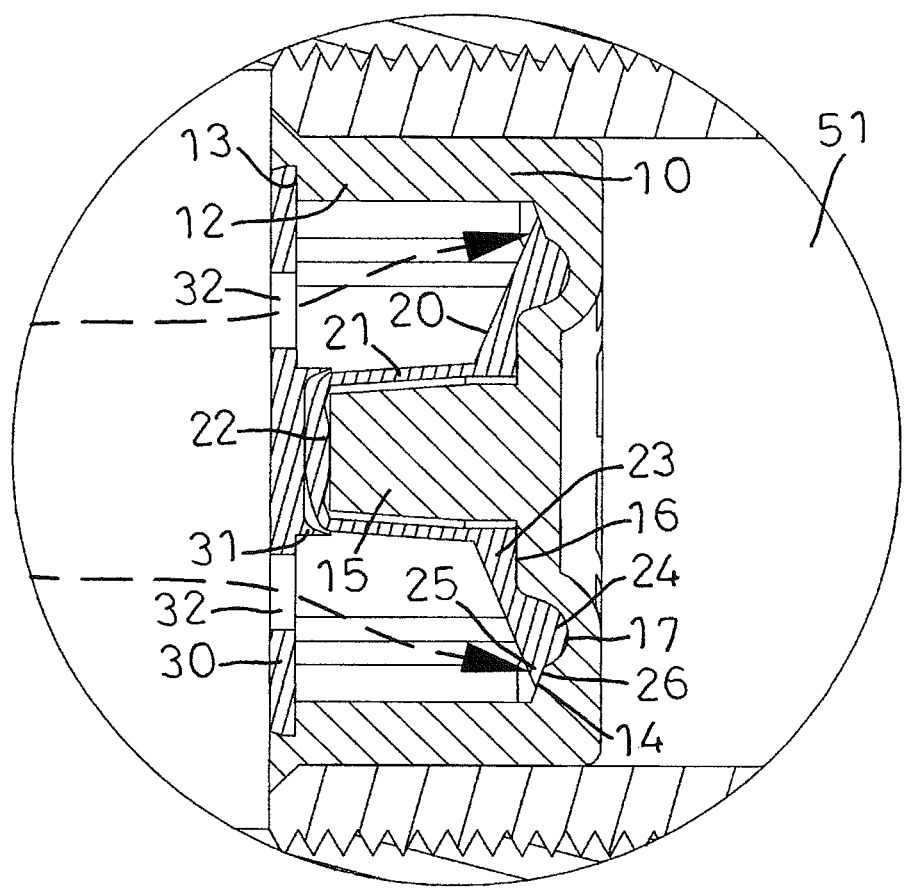
FIG·7

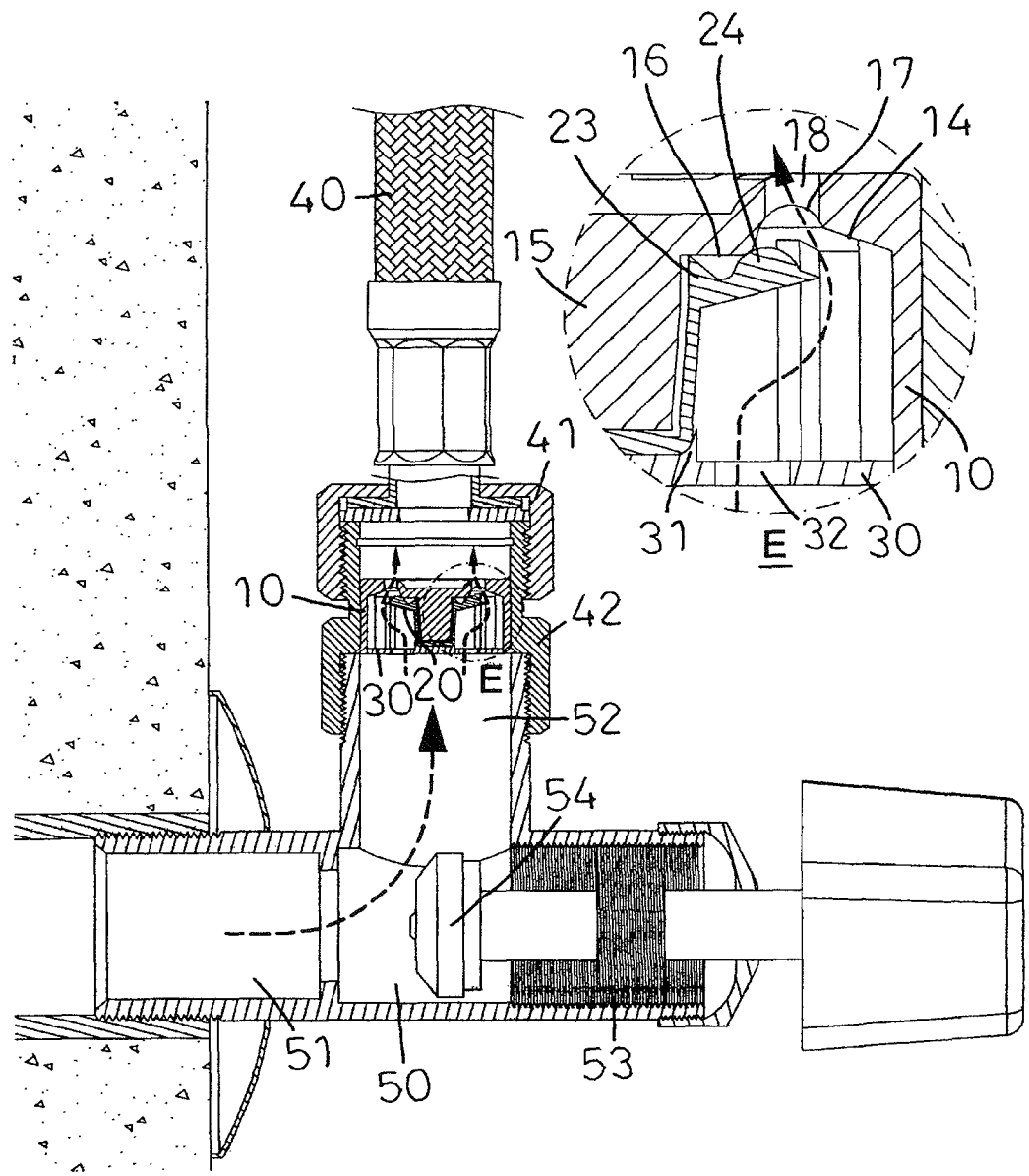
FIG·8

FLOW CONTROL VALVE

BACKGROUND OF THE INVENTION

1. Field of the Invention

The present invention relates to a control valve and, more particularly, to a flow control valve for a pipeline.

2. Description of the Related Art

A pipeline is used to convey water, oil or gas. The pipeline is subjected to a determined pressure. When the pressure applied on the pipeline exceeds a predetermined value, the pipeline is broken easily. Thus, it is necessary to provide a control device to control the flow rate in the pipeline and to shut the flow in the pipeline when the pressure applied on the pipeline exceeds the predetermined value. However, the pipeline is not provided with such a control device, thereby causing a danger or an accident

BRIEF SUMMARY OF THE INVENTION

In accordance with the present invention, there is provided a flow control valve comprising a valve body, a control member and a cover. The valve body has an interior provided with a receiving space for receiving the control member and the cover. The receiving space of the valve body has a bottom having a periphery provided with a resting face and having a central position provided with a shaft portion for positioning the control member. The shaft portion of the valve body has a bottom provided with a stepped face, and a positioning groove is defined between the stepped face and the resting face. The positioning groove of the valve body is provided with a plurality of water outlet holes that are arranged in a radiating manner and are equally distant from each other. The control member has a central position provided with a hollow bushing mounted on the shaft portion of the valve body. The bushing of the control member has an interior having a bottom face provided with an abutment corresponding to a top face of the shaft portion. When the control member is subjected to a determined pressure, a top of the bushing extends downward to present an arcuate shape. The control member is provided with an elastic portion corresponding to the stepped face of the valve body. The elastic portion of the control member is contracted inward and expanded outward. The control member is provided with a positioning projection corresponding to the positioning groove of the valve body. The control member is provided with a sealing portion corresponding to the resting face of the valve body. The sealing portion of the control member is provided with an abutting face. When a flow pressure of the fluid is under a normal condition, the elastic portion of the control member is contracted inward, so that the abutting face of the sealing portion of the control member is disposed at an open state. When the flow pressure of the fluid is under an abnormal condition, the elastic portion of the control member is expanded outward and abuts the stepped face of the valve body, so that the abutting face of the sealing portion of the control member abuts the resting face of the valve body tightly and closely, to seal the water outlet holes of the valve body. The cover covers an upper portion of the valve body. The cover has a central position provided with a flange mounted on the bushing of the control member. The cover has a periphery provided with a plurality of water inlet holes connected to the receiving space of the valve body.

According to the primary advantage of the present invention, when the pressure of the fluid exceeds a determined value, the elastic portion of the control member is expanded outward and smoothly abuts the stepped face of the valve body, so that the abutting face of the sealing portion of the control member presses the resting face of the valve body tightly and closely, to seal the water outlet holes of the valve body, so that the fluid is interrupted and cannot flow outward from the water outlet holes of the valve body, to prevent the water pipe from being broken due to an excessive pressure, thereby achieving the purpose of controlling the flow rate and preventing the water pipe from being broken.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 1 is a front perspective partially cross-sectional view of a flow control valve in accordance with the preferred embodiment of the present invention.

FIG. 2 is a bottom perspective partially cross-sectional view of the flow control valve in accordance with the preferred embodiment of the present invention.

FIG. 3 is an exploded perspective view of the flow control valve as shown in FIG. 1.

FIG. 4 is a cross-sectional view of the flow control valve as shown in FIG. 1.

FIG. 5 is a cross-sectional view of the flow control valve taken along line P-P as shown in FIG. 4.

FIG. 6 is a cross-sectional view of the flow control valve for a first pipe of a three-way connector at the open state under the normal fluid pressure condition, and a locally enlarged view taken along mark "M".

FIG. 7 is a locally enlarged cross-sectional view of the flow control valve as shown in FIG. 6 at the closed state under the abnormal fluid pressure condition.

FIG. 8 is a cross-sectional view of the flow control valve for a second pipe of a three-way connector at the open state under the normal fluid pressure condition, and a locally enlarged view taken along mark "E".

DETAILED DESCRIPTION OF THE INVENTION

Figure 9:
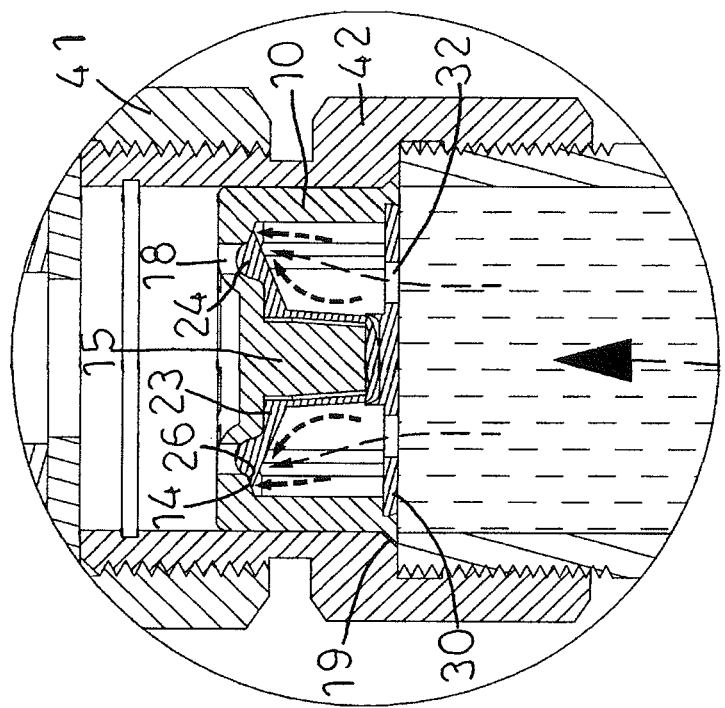
FIG. 9 is a locally enlarged cross-sectional view of the flow control valve as shown in FIG. 8 at the open state under the normal fluid pressure condition.

Referring to the drawings and initially to FIGS. 1-5, a flow control valve in accordance with the preferred embodiment of the present invention comprises a valve body 10, a control member 20 and a cover 30.

The valve body 10 has an interior provided with a receiving space 11 for receiving the control member 20 and the cover 30. The receiving space 11 of the valve body 10 has a bottom having a periphery provided with a resting face 14 and having a central position provided with a shaft portion 15 for positioning the control member 20. The shaft portion 15 of the valve body 10 has a bottom provided with a flat stepped face 16, and a positioning groove 17 is defined between the stepped face 16 and the resting face 14. The positioning groove 17 of the valve body 10 is provided with a plurality of water outlet holes 18 that are arranged in a radiating manner and are equally distant from each other so that a fluid is evenly diffused from the resting face 14 of the valve body 10 and flows outward from the water outlet holes 18 of the valve body 10.

The control member 20 has a central position provided with a hollow bushing 21 mounted on the shaft portion 15 of the valve body 10. The bushing 21 of the control member 20 has an interior having a bottom face provided with a slightly projecting abutment 22 corresponding to a top face of the shaft portion 15. When the control member 20 is subjected to a determined pressure, a top of the bushing 21 extends downward to present an arcuate shape. The control member 20 is provided with an elastic portion 23 corresponding to the stepped face 16 of the valve body 10. The elastic portion 23 of the control member 20 is contracted inward and expanded outward to present an elastic deformation. The control member 20 is provided with a positioning projection 24 corresponding to the positioning groove 17 of the valve body 10. The positioning projection 24 of the control member 20 has a shape and a size conforming to that of the positioning groove 17 of the valve body 10. The control member 20 is provided with a sealing portion 25 corresponding to the resting face 14 of the valve body 10. The sealing portion 25 of the control member 20 is provided with an abutting face 26. When a flow pressure of the fluid is under a normal condition, the elastic portion 23 of the control member 20 is contracted inward, so that the abutting face 26 of the sealing portion 25 of the control member 20 is disposed at an open state. When the flow pressure of the fluid is under an abnormal condition, the elastic portion 23 of the control member 20 is expanded outward and abuts the stepped face 16 of the valve body 10, so that the abutting face 26 of the sealing portion 25 of the control member 20 abuts the resting face 14 of the valve body 10 tightly and closely, to seal the water outlet holes 18 of the valve body 10, and to prevent the fluid from flowing outward from the water outlet holes 18 of the valve body 10.

The cover 30 covers an upper portion of the valve body 10. The cover 30 has a central position provided with a flange 31 mounted on the bushing 21 of the control member 20. The cover 30 has a periphery provided with a plurality of water inlet holes 32 connected to the receiving space 11 of the valve body 10. The water inlet holes 32 of the cover 30 are equally distant from each other so that the fluid evenly flows from the water inlet holes 32 of the cover 30 into the receiving space 11 of the valve body 10.

In the preferred embodiment of the present invention, each of the valve body 10 and the cover 30 is made of fiber reinforced plastics (FRP). The control member 20 is made of an elastically deformable material, such as silicone or rubber. Each of the positioning groove 17 of the valve body 10 and the positioning projection 24 of the control member 20 has a substantially semi-circular shape. Each of the shaft portion 15 of the valve body 10 and the bushing 21 of the control member 20 has a substantially conical shape with a smaller upper end and a larger lower end. The receiving space 11 of the valve body 10 has an inner wall provided with a plurality of ribs 12 that are arranged in a longitudinal direction. Each of the ribs 12 has an upper end defining a space to form a stepped edge 13 for placing the cover 30. The resting face 14 of the valve body 10 has an inclined shape with a higher outer portion and a lower inner portion. The upper portion of the valve body 10 is provided with an enlarged stop edge 19 for positioning the valve body 10 in a pipeline or a coupling.

In assembly, referring to FIG. 6 with reference to FIGS. 1-5, a faucet (not shown) of a sink (not shown) has a lower end provided with a water pipe 40 and a coupling 41. A water inlet pipe 1 is mounted in a wall. A three-way connector 50 is mounted between the water inlet pipe 1 and the coupling 41. The three-way connector 50 includes a first pipe 51 locked into the water inlet pipe 1, a second pipe 52 locked into the coupling 41 and a third pipe 53 provided with a switch 54. The switch 54 is movable between a first position where the first pipe 51 is connected to the second pipe 52 so that the water in the water inlet pipe 1 can flow through the first pipe 51, the second pipe 52 and the water pipe 40 into the faucet, and a second position where the first pipe 51 is disconnected from the second pipe 52 so that the water in the water inlet pipe 1 is interrupted and cannot flow into the faucet. In the preferred embodiment of the present invention, the flow control valve is selectively mounted in the first pipe 51 of the three-way connector 50. When the flow pressure of the fluid is under the normal condition, the fluid evenly flows from the water inlet holes 32 of the cover 30 into the receiving space 11 of the valve body 10, and then flows through the water outlet holes 18 of the valve body 10, the first pipe 51, the second pipe 52 and the water pipe 40 into the faucet. At this time, the elastic portion 23 of the control member 20 is contracted inward, so that the abutting face 26 of the sealing portion 25 of the control member 20 is disposed at the open state.

Referring to FIG. 7 with reference to FIGS. 1-6, when the flow pressure of the fluid is under the abnormal condition, the elastic portion 23 of the control member 20 is expanded outward and abuts the stepped face 16 of the valve body 10, so that the abutting face 26 of the sealing portion 25 of the control member 20 abuts the resting face 14 of the valve body 10 tightly and closely, to seal the water outlet holes 18 of the valve body 10, so that the fluid is interrupted and cannot flow outward from the water outlet holes 18 of the valve body 10, thereby preventing the water pipe 40 from being broken due to an excessive pressure.

Referring to FIGS. 8 and 9 with reference to FIGS. 1-5, a fitting 42 is mounted between the second pipe 52 of the three-way connector 50 and the coupling 41, and the flow control valve is selectively mounted in the fitting 42. When the flow pressure of the fluid is under the normal condition, the fluid flows through the first pipe 51 into the second pipe 52, then evenly flows from the water inlet holes 32 of the cover 30 into the receiving space 11 of the valve body 10, and then flows through the water outlet holes 18 of the valve body 10 and the water pipe 40 into the faucet.

Figure 10:
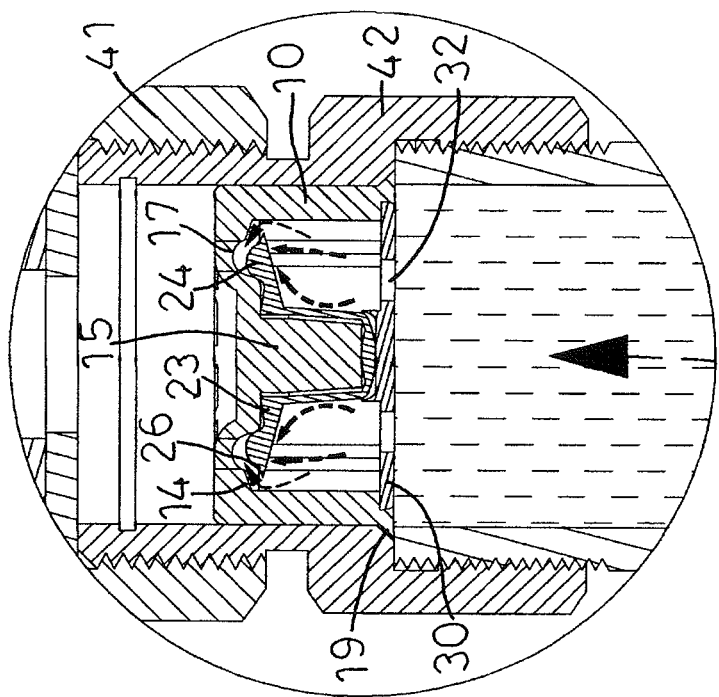
FIG. 10 is a locally enlarged cross-sectional view of the flow control valve as shown in FIG. 8 at the closed state under the abnormal fluid pressure condition.

Referring to FIG. 10 with reference to FIGS. 1-5, when the flow pressure of the fluid is under the abnormal condition, the elastic portion 23 of the control member 20 is expanded outward and abuts the stepped face 16 of the valve body 10, so that the abutting face 26 of the sealing portion 25 of the control member 20 abuts the resting face 14 of the valve body 10 tightly and closely, to seal the water outlet holes 18 of the valve body 10, so that the fluid is interrupted and cannot flow outward from the water outlet holes 18 of the valve body 10, thereby preventing the water pipe 40 from being broken due to an excessive pressure.

Accordingly, when the pressure of the fluid exceeds a determined value, the elastic portion 23 of the control member 20 is expanded outward and smoothly abuts the stepped face 16 of the valve body 10, so that the abutting face 26 of the sealing portion 25 of the control member 20 presses the resting face 14 of the valve body 10 tightly and closely, to seal the water outlet holes 18 of the valve body 10, so that the fluid is interrupted and cannot flow outward from the water outlet holes 18 of the valve body 10, to prevent the water pipe 40 from being broken due to an excessive pressure, thereby achieving the purpose of controlling the flow rate and preventing the water pipe 40 from being broken.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A flow control valve comprising:

a valve body, a control member and a cover;

wherein:

the valve body has an interior provided with a receiving space for receiving the control member and the cover;

the receiving space of the valve body has a bottom having a periphery provided with a resting face and having a central position provided with a shaft portion for positioning the control member;

the shaft portion of the valve body has a bottom provided with a stepped face, and a positioning groove is defined between the stepped face and the resting face;

the positioning groove of the valve body is provided with a plurality of water outlet holes that are arranged in a radiating manner and are equally distant from each other;

the control member has a central position provided with a hollow bushing mounted on the shaft portion of the valve body;

the bushing of the control member has an interior having a bottom face provided with an abutment corresponding to a top face of the shaft portion;

when the control member is subjected to a determined pressure, a top of the bushing extends downward to present an arcuate shape;

the control member is provided with an elastic portion corresponding to the stepped face of the valve body;

the elastic portion of the control member is contracted inward and expanded outward;

the control member is provided with a positioning projection corresponding to the positioning groove of the valve body;

the control member is provided with a sealing portion corresponding to the resting face of the valve body;

the sealing portion of the control member is provided with an abutting face;

when a flow pressure of the fluid is under a normal condition, the elastic portion of the control member is contracted inward, so that the abutting face of the sealing portion of the control member is disposed at an open state;

when the flow pressure of the fluid is under an abnormal condition, the elastic portion of the control member is expanded outward and abuts the stepped face of the valve body, so that the abutting face of the sealing portion of the control member abuts the resting face of the valve body tightly and closely, to seal the water outlet holes of the valve body;

the cover covers an upper portion of the valve body;

the cover has a central position provided with a flange mounted on the bushing of the control member; and the cover has a periphery provided with a plurality of water inlet holes connected to the receiving space of the valve body.

2. The flow control valve of claim 1, wherein each of the valve body and the cover is made of fiber reinforced plastics.

3. The flow control valve of claim 1, wherein the control member is made of silicone or rubber.

4. The flow control valve of claim 1, wherein each of the positioning groove of the valve body and the positioning projection of the control member has a substantially semi-circular shape.

5. The flow control valve of claim 1, wherein each of the shaft portion of the valve body and the bushing of the control member has a substantially conical shape with a smaller upper end and a larger lower end.

6. The flow control valve of claim 1, wherein the receiving space of the valve body has an inner wall provided with a plurality of ribs that are arranged in a longitudinal direction, and each of the ribs has an upper end defining a space to form a stepped edge for placing the cover.

7. The flow control valve of claim 1, wherein the resting face of the valve body has an inclined shape with a higher outer portion and a lower inner portion.

8. The flow control valve of claim 1, wherein the upper portion of the valve body is provided with an enlarged stop edge.

* * * * *